(12) United States Patent
Zhang et al.

(10) Patent No.: US 11,405,163 B2
(45) Date of Patent: Aug. 2, 2022

(54) CHANNEL QUALITY INFORMATION REPORTING METHOD, TERMINAL DEVICE, AND NETWORK DEVICE

(71) Applicant: HUAWEI TECHNOLOGIES CO., LTD., Guangdong (CN)

(72) Inventors: Di Zhang, Beijing (CN); Jianqin Liu, Beijing (CN); Hongzhe Shi, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 202 days.

(21) Appl. No.: 16/832,970

(22) Filed: Mar. 27, 2020

(65) Prior Publication Data
US 2020/0228297 A1 Jul. 16, 2020

Related U.S. Application Data

(63) Continuation of application No. PCT/CN2018/105756, filed on Sep. 14, 2018.

(30) Foreign Application Priority Data

Sep. 29, 2017 (CN) .......................... 201710911810.6

(51) Int. Cl.
*H04L 5/00* (2006.01)
*H04L 1/00* (2006.01)

(52) U.S. Cl.
CPC .......... *H04L 5/0057* (2013.01); *H04L 1/0026* (2013.01); *H04L 5/0048* (2013.01)

(58) Field of Classification Search
CPC ... H04L 5/0057; H04L 1/0026; H04L 5/0048; H04L 5/0094; H04L 1/00; H04L 1/06; H04L 1/0675; H04B 7/0632; H04W 24/10
See application file for complete search history.

(56) References Cited

U.S. PATENT DOCUMENTS

| 2005/0170782 A1 | 8/2005 | Rong et al. |
| 2014/0198763 A1 | 7/2014 | Sorrentino et al. |

(Continued)

FOREIGN PATENT DOCUMENTS

| CN | 102265543 A | 11/2011 |
| CN | 102625355 A | 8/2012 |

(Continued)

OTHER PUBLICATIONS

Ericsson,"Details on the unified CSI feedback framework",3GPP TSG-RAN WG1 #87 R1-1612348,Reno, Nevada, Nov. 14 18, 2016,total 6 pages.

(Continued)

*Primary Examiner* — Justin T Van Roie
(74) *Attorney, Agent, or Firm* — Womble Bond Dickinson (US) LLP

(57) ABSTRACT

This application provides a channel quality information reporting method, a terminal device, and a network device. The reporting method includes: receiving, by a terminal device, a first reference signal and a second reference signal that are sent by a network device; receiving, by the terminal device, first indication information sent by the network device, where the first indication information includes a quasi co-location (QCL) assumption relationship between the second reference signal and the first reference signal; and reporting, by the terminal device, second channel quality information to the network device based on the QCL assumption relationship, where the second channel quality information is channel quality information for the second reference signal. According to this application, resource overheads for reporting channel quality information can be reduced.

15 Claims, 4 Drawing Sheets

(56) References Cited

U.S. PATENT DOCUMENTS

| | | | |
|---|---|---|---|
| 2015/0016369 A1 | 1/2015 | Park et al. | |
| 2016/0006549 A1* | 1/2016 | Kim et al. | |
| 2016/0295454 A1* | 10/2016 | Kim | H04B 7/0626 |
| 2017/0078062 A1 | 3/2017 | Park et al. | |
| 2017/0201308 A1* | 7/2017 | Park | H04W 16/14 |

FOREIGN PATENT DOCUMENTS

| | | |
|---|---|---|
| CN | 103580739 A | 2/2014 |
| CN | 103945447 A | 7/2014 |
| CN | 104137440 A | 11/2014 |
| CN | 104753633 A | 7/2015 |
| CN | 104782067 A | 7/2015 |
| CN | 105580297 A | 5/2016 |
| CN | 106465293 A | 2/2017 |
| CN | 106559165 A | 4/2017 |
| WO | 2013021531 A1 | 2/2013 |
| WO | 2014069937 A1 | 5/2014 |

OTHER PUBLICATIONS

Huawei et al.,"Discussion on measurement based on SS block",3GPP TSG RAN WG1 Meeting #89 R1-1708167, Hangzhou, China, May 15-19, 2017,total 3 pages.

Wang Fang et al., Analysis of Common Parameters in TD-LTE DTs. Telecom Express, Telecommunications Information, Issue 07, 2012, 4 pages.

A. Gambetta et al., Absolute Frequency Spectroscopy at 4.3 m by Direct Referencing of a Quantum-Cascade-Laser to an Er:fiber Laser-Based Frequency-Comb. 2011 Conference on Lasers and Electro-Optics Europe and 12th European Quantum Electronics Conference (CLEO Europe/EQEC), Jul. 7, 2011, 1 page.

* cited by examiner

CHANNEL QUALITY INFORMATION REPORTING METHOD, TERMINAL DEVICE, AND NETWORK DEVICE

CROSS-REFERENCE TO RELATED APPLICATIONS

This application is a continuation of International Application No. PCT/CN2018/105756, filed on Sep. 14, 2018, which claims priority to Chinese Patent Application No. 201710911810.6, filed on Sep. 29, 2017. The disclosures of the aforementioned applications are hereby incorporated by reference in their entireties.

TECHNICAL FIELD

This application relates to the communications field, and more particularly, to a channel quality information reporting method, a terminal device, and a network device.

BACKGROUND

In a communications system, to measure channel quality, a network device may send a reference signal to a terminal device, and after receiving the reference signal, the terminal device performs channel quality measurement for the reference signal, and reports channel quality information obtained through measurement to the network device. When the network device sends a plurality of reference signals to the terminal device, the terminal device may report one or more pieces of channel quality information to the network device based on a configuration of the network device. When a relatively large quantity of pieces of channel quality information need to be reported, reporting overheads of the terminal device are very high. Therefore, when the terminal device needs to report a plurality of pieces of channel quality information, how to minimize reporting overheads of the terminal is a problem needing to be resolved.

SUMMARY

This application provides a channel quality information reporting method, a terminal device, and a network device, to reduce resource overheads for reporting channel quality information.

According to a first aspect, a channel quality information reporting method is provided. The method includes: receiving, by a terminal device, a first reference signal and a second reference signal that are sent by a network device; receiving, by the terminal device, first indication information sent by the network device, where the first indication information includes a quasi co-location (QCL) assumption relationship between the second reference signal and the first reference signal; and reporting, by the terminal device, second channel quality information to the network device based on the QCL assumption relationship, where the second channel quality information is channel quality information for the second reference signal.

The second channel quality information is reported based on the QCL assumption relationship between the second reference signal and the first reference signal, so that resource overheads for reporting the second channel quality information can be reduced. In one embodiment, when the first reference signal and the second reference signal meet a QCL assumption, some spatial features of the first reference signal and the second reference signal are strongly correlated, so that channel quality information respectively corresponding to the first reference signal and the second reference signal is relatively similar. Therefore, when the second channel quality information is reported, the channel quality information for the first reference signal may be used as a reference, and when the channel quality information for the second reference signal is reported, only differential information between the channel quality information for the second reference signal and the channel quality information for the first reference signal is reported, thereby greatly reducing the resource overheads for reporting the second channel quality information.

In one embodiment, the reporting channel quality information for the second reference signal to the network device includes: reporting, by the terminal device, the second channel quality information to the network device based on at least one of the following information that is determined based on the QCL assumption relationship: reference channel quality information for the second channel quality information; a reporting operation of the second channel quality information; a reporting range of the second channel quality information; and a reporting bit quantity of the second channel quality information.

In one embodiment, the reporting, by the terminal device, the second channel quality information to the network device based on the QCL assumption relationship between the second reference signal and the first reference signal includes: when the first reference signal and the second reference signal meet a QCL assumption, determining, by the terminal device, the reference channel quality information for the second channel quality information; and reporting, by the terminal device, differential information between the second channel quality information and the reference channel quality information to the network device.

In one embodiment, the determining, by the terminal device, the reference channel quality information for the second channel quality information includes: determining, by the terminal device, channel quality information for the first reference signal as the reference channel quality information for the second channel quality information.

In one embodiment, the determining, by the terminal device, the reference channel quality information for the second channel quality information includes: determining, by the terminal device, the reference channel quality information for the second channel quality information based on channel quality information for the first reference signal and first compensation information.

In one embodiment, the first compensation information is configured by the network device for the terminal device by using at least one of higher layer signaling or physical layer signaling, or the first compensation information is preset information.

In one embodiment, the determining, by the terminal device, the reference channel quality information for the second channel quality information includes: determining, by the terminal device, the reference channel quality information for the second channel quality information based on the second channel quality information.

In one embodiment, the reporting, by the terminal device, the second channel quality information to the network device based on the QCL assumption relationship between the second reference signal and the first reference signal includes: when the first reference signal and the second reference signal do not meet a QCL assumption, reporting, by the terminal device, the second channel quality information to the network device in a non-differential manner.

In one embodiment, the first reference signal includes a synchronization signal block, and the second reference signal includes a channel state information-reference signal (CSI-RS).

In one embodiment, when the first reference signal and the second reference signal meet a QCL assumption, a quantity of bits occupied for reporting the second channel quality information is a first bit quantity; when the first reference signal and the second reference signal do not meet the QCL assumption, a quantity of bits occupied for reporting the second channel quality information is a second bit quantity; and the first bit quantity is less than or equal to the second bit quantity.

According to a second aspect, a channel quality information reporting method is provided. The method includes: sending, by a network device, a first reference signal and a second reference signal to a terminal device; sending, by the network device, first indication information to the terminal device, where the first indication information includes a quasi co-location (QCL) assumption relationship between the second reference signal and the first reference signal; and receiving, by the network device, second channel quality information that is reported by the terminal device based on the QCL assumption relationship, where the second channel quality information is channel quality information for the second reference signal.

The second channel quality information is reported based on the QCL assumption relationship between the second reference signal and the first reference signal, so that resource overheads for reporting the second channel quality information can be reduced. In one embodiment, when the first reference signal and the second reference signal meet a QCL assumption, some spatial features of the first reference signal and the second reference signal are strongly correlated, so that channel quality information respectively corresponding to the first reference signal and the second reference signal is relatively similar. Therefore, when the second channel quality information is reported, the channel quality information for the first reference signal may be used as a reference, and when the channel quality information for the second reference signal is reported, only differential information between the channel quality information for the second reference signal and the channel quality information for the first reference signal is reported, thereby greatly reducing the resource overheads for reporting the second channel quality information.

In one embodiment, the receiving, by the network device, the second channel quality information that is reported by the terminal device based on the QCL assumption relationship includes: receiving, by the network device, the second channel quality information that is reported by the terminal device based on at least one of the following information that is determined based on the QCL assumption relationship; reference channel quality information for the second channel quality information; a reporting operation of the second channel quality information; a reporting range of the second channel quality information; and a reporting bit quantity of the second channel quality information.

In one embodiment, the method further includes: when the first reference signal and the second reference signal meet a QCL assumption, determining, by the network device, the reference channel quality information for the second channel quality information; and the receiving, by the network device, the second channel quality information that is reported by the terminal device based on the QCL assumption relationship between the second reference signal and the first reference signal includes: receiving, by the network device, differential information that is between the second channel quality information and the reference channel quality information and that is reported by the terminal device.

In one embodiment, the determining, by the network device, the reference channel quality information for the second channel quality information includes: determining, by the network device, channel quality information for the first reference signal as the reference channel quality information for the second channel quality information.

In one embodiment, the determining, by the network device, the reference channel quality information for the second channel quality information includes: determining, by the network device, the reference channel quality information for the second channel quality information based on channel quality information for the first reference signal and first compensation information.

In one embodiment, the first compensation information is preset information.

In one embodiment, the determining, by the network device, the reference channel quality information for the second channel quality information includes: determining, by the network device, the reference channel quality information for the second channel quality information based on the second channel quality information.

In one embodiment, the receiving, by the network device, the second channel quality information that is reported by the terminal device based on the QCL assumption relationship between the second reference signal and the first reference signal includes: when the first reference signal and the second reference signal do not meet a QCL assumption, receiving, by the network device, the second channel quality information that is reported by the terminal device in a non-differential manner.

In one embodiment, the first reference signal includes a synchronization signal block, and the second reference signal includes a channel state information-reference signal (CSI-RS).

In one embodiment, when the first reference signal and the second reference signal meet a QCL assumption, a quantity of bits occupied for reporting the second channel quality information is a first bit quantity; when the first reference signal and the second reference signal do not meet the QCL assumption, a quantity of bits occupied for reporting the second channel quality information is a second bit quantity; and the first bit quantity is less than or equal to the second bit quantity.

According to a third aspect, a terminal device is provided. The terminal device includes modules configured to perform the method according to any one of the first aspect or the embodiments of the first aspect.

According to a fourth aspect, a network device is provided. The network device includes modules configured to perform the method according to any one of the second aspect or the embodiments of the second aspect.

According to a fifth aspect, a terminal device is provided. The terminal device includes a memory, a transceiver, and a processor. The memory is configured to store a program. The processor is configured to execute the program. When the program is executed, the processor and the transceiver perform the method according to any one of the first aspect or the embodiments of the first aspect.

According to a sixth aspect, a network device is provided. The network device includes a memory, a transceiver, and a processor. The memory is configured to store a program. The processor is configured to execute the program. When the program is executed, the processor and the transceiver perform the method according to any one of the second aspect or the embodiments of the second aspect.

According to a seventh aspect, a terminal device is provided. The terminal device includes a storage medium and a central processing unit. The storage medium may be a non-volatile storage medium. The storage medium stores a computer executable program. The central processing unit is connected to the non-volatile storage medium, and executes the computer executable program, to implement the method according to any one of the first aspect or the embodiments of the first aspect.

According to an eighth aspect, a network device is provided. The network device includes a storage medium and a central processing unit. The storage medium may be a non-volatile storage medium. The storage medium stores a computer executable program. The central processing unit is connected to the non-volatile storage medium, and executes the computer executable program, to implement the method according to any one of the second aspect or the embodiments of the second aspect.

According to a ninth aspect, a chip is provided. The chip includes a processor and a communications interface. The communications interface is configured to communicate with an external device. The processor is configured to perform the method according to any one of the first aspect or the embodiments of the first aspect.

In an embodiment, the chip may further include a memory. The memory stores an instruction. The processor is configured to execute the instruction stored in the memory. When the instruction is executed, the processor is configured to perform the method according to any one of the first aspect or the embodiments of the first aspect.

In one embodiment, the chip is integrated into a terminal device.

According to a tenth aspect, a chip is provided. The chip includes a processor and a communications interface. The communications interface is configured to communicate with an external device. The processor is configured to perform the method according to any one of the second aspect or the embodiments of the second aspect.

In one embodiment, the chip may further include a memory. The memory stores an instruction. The processor is configured to execute the instruction stored in the memory. When the instruction is executed, the processor is configured to perform the method according to any one of the second aspect or the embodiments of the second aspect.

In one embodiment, the chip is integrated into a network device.

According to an eleventh aspect, a computer-readable storage medium is provided. The computer-readable storage medium stores program code to be executed by a device. The program code includes an instruction for performing the method according to any one of the first aspect or the embodiments of the first aspect.

According to a twelfth aspect, a computer-readable storage medium is provided. The computer-readable storage medium stores program code to be executed by a device. The program code includes an instruction for performing the method according to any one of the second aspect or the embodiments of the second aspect.

DESCRIPTION OF EMBODIMENTS

The following describes the technical solutions of this application with reference to the accompanying drawings.

The technical solutions of the embodiments of this application may be applied to various communications systems, such as: a global system for mobile communication (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunications system (UMTS), a worldwide interoperability for microwave access (WiMAX) communications system, a future 5th generation (5G) system, or new radio (NR).

A terminal device in the embodiments of this application may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

A network device in the embodiments of this application may be a device configured to communicate with the terminal device. The network device may be a base transceiver station (BTS) in a global system for mobile communications (GSM) or code division multiple access (CDMA), or may be a NodeB (NB) in a wideband code division multiple access (WCDMA) system, or may be an evolved NodeB (eNB or eNodeB) in an LTE system, or may be a radio controller in a cloud radio access network (CRAN) scenario. Alternatively, the network device may be a relay station, an access point, a vehicle-mounted device, a wearable device, a network device in a future 5G network, a network device in a future evolved PLMN network, or the like. This is not limited in the embodiments of this application.

Figure 1:
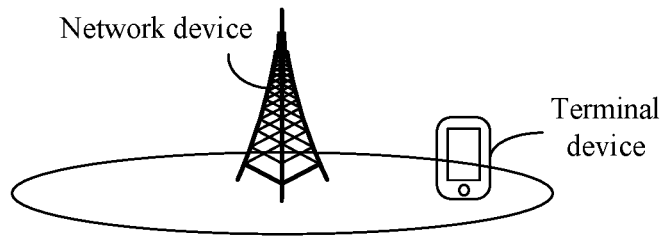
FIG. 1 is a schematic diagram of an application scenario according to an embodiment of this application.

FIG. 1 is a schematic diagram of an application scenario according to an embodiment of this application. A communications system shown in FIG. 1 includes a network device and a terminal device. The network device may send one or more reference signals to the terminal device, and after receiving the reference signal, the terminal device may detect channel quality of a channel on which the reference signal is located, and report channel quality information obtained through detection to the network device. It should be understood that, FIG. 1 shows a communications system including only one terminal device and one network device. Actually, this embodiment of this application may be further applied to a communications system including a plurality of terminal devices and a plurality of network devices.

Figure 2:
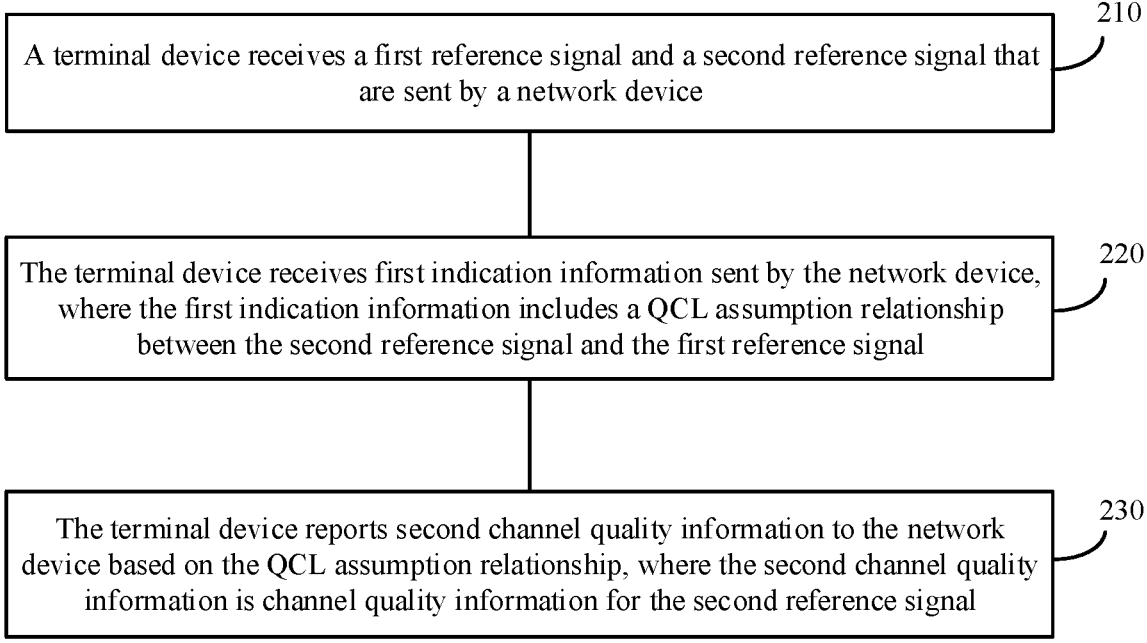
FIG. 2 is a schematic flowchart of a channel quality information reporting method according to an embodiment of this application.

FIG. 2 is a schematic flowchart of a channel quality information reporting method according to an embodiment of this application. The method shown in FIG. 2 includes operation 210 to operation 230. The following describes operation 210 to operation 230 in detail.

210. A terminal device receives a first reference signal and a second reference signal that are sent by a network device.

The first reference signal may be any one of a channel state information-reference signal (CSI-RS) or a synchronization signal block.

Preferably, the first reference signal is a synchronization signal block. The synchronization signal block is short for a synchronization signal and broadcast channel block (where the synchronization signal block includes a synchronization signal and a broadcast channel block), and the synchronization signal block includes at least one of a primary synchronization signal, a secondary synchronization signal, a broadcast channel, or a demodulation reference signal of a broadcast channel.

The second reference signal may be a CSI-RS, or may be a reference signal other than a CSI-RS, for example, a downlink demodulation reference signal DMRS (or dedicated modulation reference signal (DMRS)).

In operation 210, the terminal device may receive the first reference signal and the second reference signal at a same moment or different moments. This is not limited herein.

220. The terminal device receives first indication information sent by the network device, where the first indication information includes a quasi co-location (QCL) assumption relationship between the second reference signal and the first reference signal.

It should be understood that, the QCL assumption relationship may also be referred to as a quasi co-location assumption relationship. The QCL assumption relationship includes at least one of related parameters such as a delay spread, an angle spread, and a Doppler frequency domain.

In this application, the QCL assumption relationship includes: a QCL assumption is met and a QCL assumption is not met. Further, when the QCL assumption is met, first reference signal index information associated with the QCL assumption is further included.

When the first reference signal and the second reference signal meet the QCL assumption, some spatial features of the first reference signal and the second reference signal are strongly correlated, so that channel quality information respectively corresponding to the first reference signal and the second reference signal is relatively similar. In other words, when some spatial features of the first reference signal and the second reference signal are strongly correlated, it may be considered that the first reference signal and the second reference signal meet the QCL assumption. However, if no spatial features of the first reference signal and the second reference signal are strongly correlated, it may be considered that the first reference signal and the second reference signal do not meet the QCL assumption.

In addition, the QCL assumption relationship may further include a spatial feature parameter, and the spatial feature parameter may describe a spatial channel feature between antenna ports for a reference signal. It should be understood that, when spatial feature parameters of the first reference signal and the second reference signal are relatively similar, it may be considered that the spatial features of the first reference signal and the second reference signal are strongly correlated.

The spatial feature parameter may include the following several parameters:

(1). Angle of Departure Related Parameter

The angle of departure related parameter may include an azimuth angle of departure (AoD) and/or a zenith angle of departure (ZoD).

(2). Angle Spread Related Parameter

The angle spread related parameter may include an azimuth angle spread (ASD) and/or a zenith angle spread (ZSD).

(3). Angle of Arrival Related Parameter

The angle of arrival related parameter may include an azimuth angle of arrival (AoA) and/or a zenith angle of arrival (ZoA).

In operation 220, the first indication information may indicate a QCL assumption relationship between a plurality of reference signals. In one embodiment, the first indication information may indicate that some reference signals meet the QCL assumption, and the other reference signals do not meet the QCL assumption. When the first indication information indicates that the first reference signal and the second reference signal meet the QCL assumption, it means that the terminal device can receive the second reference signal based on some parameter information of the first reference signal, or the terminal device can receive the first reference signal based on some parameter information of the second reference signal.

The foregoing QCL assumption information may further indicate a relationship between spatial feature parameters of reference signals. For example, when indicating that the first reference signal and the second reference signal meet the QCL assumption, the first indication information may further indicate a relationship between related parameters such as angles of departure and angles of arrival of antenna ports corresponding to the first reference signal and the second reference signal.

230. The terminal device reports second channel quality information to the network device based on the QCL assumption relationship between the second reference signal and the first reference signal.

In operation 230, the second channel quality information is channel quality information for the second reference signal, and the second channel quality information may be obtained by the terminal device by measuring channel quality for the second reference signal.

The second channel quality information may include at least one of a received power of the second reference signal, a received quality of the second reference signal, and a resource index of the second reference signal.

In one embodiment, when the second reference signal is a channel state information-reference signal (CSI-RS), the second channel quality information may further include channel state information (CSI), and the CSI may include at least one of a rank indicator (RI), a precoding indicator (precoding matrix indicator, PMI), a channel quality indicator (CQI), or the resource index of the second reference signal.

In operation 230, the terminal device may report the second channel quality information to the network device through a physical uplink control channel (PUCCH) or a physical uplink shared channel (PUSCH). The physical uplink control channel includes two types: a physical uplink control channel of a long format and a physical uplink control channel of a short format.

It should be understood that, in addition to reporting the second channel quality information to the network device, the terminal device may further report first channel quality information (channel quality information for the first reference signal) to the network device. The terminal device may simultaneously report the first channel quality information and the second channel quality information to the network device. Alternatively, the terminal device may first report the first channel quality information to the network device, and then report the second channel quality information to the network device.

In this application, the second channel quality information is reported based on the QCL assumption relationship between the second reference signal and the first reference signal, so that resource overheads for reporting the second channel quality information can be reduced.

In one embodiment, when the first reference signal and the second reference signal meet the QCL assumption, some spatial features of the first reference signal and the second reference signal are strongly correlated, so that the channel quality information respectively corresponding to the first reference signal and the second reference signal is relatively similar. Therefore, when the second channel quality information is reported, the channel quality information for the first reference signal may be used as a reference, and when the channel quality information for the second reference signal is reported, only differential information between the channel quality information for the second reference signal and the channel quality information for the first reference signal is reported, thereby greatly reducing the resource overheads for reporting the second channel quality information.

In one embodiment, in operation 230, the reporting, by the terminal device, channel quality information for the second reference signal to the network device includes:

reporting, by terminal device, the channel quality information for the second reference signal to the network device based on at least one of the following information (4) to (7) that is determined based on the QCL assumption relationship between the second reference signal and the first reference signal:

(4). Reference Channel Quality Information for the Second Channel Quality Information When reporting the second channel quality information based on the reference channel quality information for the second channel quality information, the terminal device may report differential information between the second channel quality information and the reference channel quality information. When the second channel quality information is the received power of the second reference signal, and the reference channel quality information for the second channel quality information is a reference received power, the differential information may be a differential value between the received power of the second reference signal and the reference received power. In other words, in this case, the differential value between the received power of the second reference signal and the reference received power may be directly reported. It should be understood that, in addition to reporting the differential information between the second channel quality information and the reference channel quality information to the network device, the terminal device may further report the reference channel quality information to the network device. The terminal device may simultaneously report the reference channel quality information and the differential information between the second channel quality information and the reference channel quality information to the network device. Alternatively, the terminal device may first report the reference channel quality information to the network device, and then report the differential information between the second channel quality information and the reference channel quality information to the network device.

(5). Reporting Operation of the Second Channel Quality Information

For example, when the second channel quality information is the received power of the second reference signal, the reporting operation of the second channel quality information is quantization precision used when the second channel quality information is quantized. For example, the reporting operation of the second channel quality information is 1 db. When the reporting operation is 1 db, the second channel quality information needs to be quantized by using a quantization bit width of 1 db. The second channel quality information may be channel quality information in a form of a difference from the reference channel quality information, or may be channel quality information in a non-differential form.

(6). Reporting Range of the Second Channel Quality Information

When the second channel quality information is the received quality of the second reference signal, the reporting range of the second channel quality information may be a value range of the received quality of the second reference signal. For example, the reporting range of the received quality of the second reference signal is −19.5 dB to −3 dB, and a larger value indicates a better received quality of the second reference signal.

When the second channel quality information is the received power of the second reference signal, the reporting range of the second channel quality information may be a value range of the received power of the second reference signal. For example, the reporting range of the second channel quality information is −140 dbm to −44 dbm.

That the reporting range of the second channel quality information is determined based on the QCL assumption relationship between the first reference signal and the second reference signal may be: When the QCL assumption relationship between the first reference signal and the second reference signal is true (that is, the first reference signal and the second reference signal meet the QCL assumption), the reporting range of the second channel quality information is a first reporting range; when the QCL assumption relationship between the first reference signal and the second reference signal is not true, the reporting range of the second channel quality information is a second reporting range; and the first reporting range is less than or equal to the second reporting range.

(7). Reporting Bit Quantity of the Second Channel Quality Information

When the second channel quality information is the received quality of the second reference signal, the reporting bit quantity of the second channel quality information may be a quantity of bits occupied when the terminal device reports the received quality of the second reference signal to the network device.

When the second channel quality information is the received power of the second reference signal, the reporting bit quantity of the second channel quality information may be a quantity of bits occupied when the terminal device reports the received power of the second reference signal to the network device.

It should be understood that, that the terminal device reports the second channel quality information to the network device based on at least one of the information (4) to (7) above may also be understood as that the terminal device determines a reporting mode to be used to report the second channel quality information to the network device.

The reporting mode herein may be understood as that the terminal device reports the second channel quality information based on at least one of the information (4) to (7) above. A value of the information in (4) to (7) is determined based on the QCL assumption relationship between the first reference signal and the second reference signal. For example, that when the first reference signal and the second reference signal meet the QCL assumption, the terminal device reports the second channel quality information to the network device based on a first value corresponding to at least one of the information (4) and (7) is a reporting mode. That when the first reference signal and the second reference signal do not meet the QCL assumption, the terminal device reports the second channel quality information to the network device based on a second value corresponding to at least one of the information (4) and (7) is another reporting mode. Herein, the first value may be different from the second value.

Further, the reporting mode herein may alternatively be understood as reporting the second channel quality information based on different values of some information in (4) to (7) above. For example, that when the reporting bit quantity of the second channel quality information is a first value, the terminal device reports the second channel quality information is a reporting mode. That when the reporting bit quantity of the second channel quality information is a second value, the terminal device reports the second channel quality information is another reporting mode.

In an embodiment, before operation 220, the method shown in FIG. 2 further includes: determining, by the terminal device, whether the second reference signal and the first reference signal meet a QCL assumption.

In one embodiment, the terminal device may determine, based on QCL assumption relationship information configured by the network device, whether the second reference signal and the first reference signal meet the QCL assumption. The QCL assumption relationship information may be configured by the network device for the terminal device by using at least one of higher layer signaling, physical layer signaling, or the like, and the QCL assumption relationship information may be used to indicate QCL assumption information of a plurality of second reference signals sent by the network device to the terminal device. In one embodiment, the QCL assumption relationship information may include resource index information of a first reference signal that meets the QCL assumption with each second reference signal, or may include information indicating whether the second reference signal and the first reference signal meet the QCL assumption.

In an embodiment, the reporting, by the terminal device, the second channel quality information to the network device based on the QCL assumption relationship between the second reference signal and the first reference signal includes: when the first reference signal and the second reference signal meet a QCL assumption, determining, by the terminal device, the reference channel quality information for the second channel quality information; and reporting, by the terminal device, differential information between the second channel quality information and the reference channel quality information to the network device.

The differential information between the second channel quality information and the reference channel quality information is reported to the network device, so that a quantity of bits occupied for reporting the second channel quality information can be reduced, and time-frequency resources occupied when the second channel quality information is reported can be reduced.

The terminal device determines the reference channel quality information for the second channel quality information in a plurality of manners. In one embodiment, the terminal device may determine the reference channel quality information for the second channel quality information in the following manners.

Manner 1:

The terminal device determines the channel quality information for the first reference signal as the reference channel quality information for the second channel quality information.

When the channel quality information for the first reference signal is a received power of the first reference signal, the received power of the first reference signal may be determined as the reference channel quality information for the second channel quality information. That is, the received power of the first reference signal is determined as a reference received power, and then when the differential information between the second channel quality information and the reference channel quality information is reported, a differential value between the received power of the second reference signal and the reference received power may be reported.

For example, when one piece of channel quality information for a second reference signal needs to be reported, if the received power of the first reference signal is −55 dbm, and a received power of the second reference signal is −50 dbm, it is determined that the reference received power is −55 dbm, and then the terminal device reports a differential value of 5 db between the received power of the second reference signal and the reference received power to the network device. When a range of the received power of the first reference signal and a range of the received power of the second reference signal are both [−144, −40] dbm, if 1 db is used as quantization precision when the received power of the first reference signal and the received power of the second reference signal are reported, 7 bits may be used to report the reference received power, and 3 bits may be used to report the differential value between the received power of the second reference signal and the reference received power. Because the second reference signal and the first reference signal meet the QCL assumption, the received power of the second reference signal is usually relatively close to the received power of the first reference signal. Therefore, a relatively small quantity of bits may be used to report the differential value between the received power of the second reference signal and the reference received power, so that a quantity of bits used by the terminal device to report the second channel quality information can be reduced when precision is ensured.

In addition, there may be a plurality of second reference signals. For example, when there are three pieces of channel quality information for second reference signals and the channel quality information for the second reference signal is a received power of the second reference signal, if the received powers of the three second reference signals are respectively {−50 dbm, −45 dbm, −44 dbm}, and the received power of the first reference signal is −55 dbm, it is determined that the reference received power is −55 dbm, and then the terminal device reports differential values of {5 db, 10 db, 11 db} between the received powers of the three second reference signals and the reference received power to the network device. When a range of the received power of the first reference signal and a range of the received power of the second reference signal are both [−144, −40] dbm, if 1 dbm is used as quantization precision when the received power of the first reference signal and the received power of the second reference signal are reported, 7 bits may be used to report the reference received power, 4 bits may be used to report the differential value between the received power of each second reference signal and the reference received power, and 3*4=12 bits are finally needed to report the received powers of the three second reference signals. When a plurality of second reference signals meet the QCL assumption with the first reference signal, received powers of the plurality of second reference signals are usually relatively close to each other, and a differential value between the received power of each second reference signal and the reference received power is also relatively small. Therefore, a relatively small quantity of quantization bits may be used to report the differential values between the received powers of the plurality of second reference signals and the reference received power.

Manner 2:

The terminal device determines the reference channel quality information for the second channel quality information based on the channel quality information for the first reference signal and first compensation information.

The first compensation information may be configured by the network device for the terminal device by using at least one of higher layer signaling or physical layer signaling, or the first compensation information is preset information (for example, may be information specified in a protocol).

When the channel quality information for the first reference signal is a received power of the first reference signal, the first compensation information may be a compensation power (a preset power value). In this case, a sum of the received power of the first reference signal and the compensation power may be determined as the reference channel quality information. That is, the sum of the received power of the first reference signal and the compensation power is determined as a reference received power, and then when the differential information between the second channel quality information and the reference channel quality information is reported, a difference value between the received power of the second reference signal and the reference received power may be reported.

For example, when there is one piece of channel quality information for a second reference signal, if the received power of the first reference signal is −65 dbm, the compensation power is 10 db, and a received power of the second reference signal is −45 dbm, −55 dbm (a sum of the received power of the first reference signal and the compensation power) is determined as a reference received power, and the terminal device reports a differential value of 10 db between the received power of the second reference signal and the reference received power to the network device. If 1 dbm is used as quantization precision when the received power of the first reference signal and the received power of the second reference signal are reported, 7 bits may be used to report the received power of the first reference signal (the network device may determine the reference received power based on the received power of the first reference signal and the compensation power), and 4 bits may be used to report the differential value between the received power of the second reference signal and the reference received power.

In addition, there may be a plurality of pieces of channel quality information for second reference signals. For example, when there are three pieces of channel quality information for second reference signals, if received powers of the second reference signals are respectively {−50 dbm, −45 dbm, −44 dbm}, the received power of the first reference signal is −65 dbm, and the compensation power is 10 db, it is determined that a reference received power is −55 dbm, and then the terminal device reports differential values of [5 db, 10 db, 11 db] between the received powers of the three second reference signals and the reference received power to the network device. If 1 dbm is used as quantization precision when the received power of the first reference signal and the received power of the second reference signal are reported, 7 bits may be used to report the reference received power, 4 bits may be used to report the differential value between the received power of each second reference signal and the reference received power, and 3*4=12 bits are finally needed to report the received powers of the three second reference signals.

Manner 3:

The terminal device determines the reference channel quality information for the second channel quality information based on the channel quality information for the second reference signal.

When the channel quality information for the second reference signal is the received power of the second reference signal, the reference channel quality information for the second channel quality information may be determined based on the received power of the second reference signal. That is, a reference received power for the received power of the second reference signal is determined based on the received power of the second reference signal.

When there are a plurality of pieces of channel quality information for second reference signals, a reference received power of the second reference signal may be determined based on received powers of the plurality of second reference signals. In one embodiment, a maximum value, a minimum value, an average value, or the like of the received powers of the plurality of second reference signals may be used as the reference received power of the second reference signal, and then the reference received power and a differential value between a received power of another second reference signal and the reference received power may be reported to the network device.

For example, when there are three pieces of channel quality information for second reference signals, if received powers of the three second reference signals are respectively {−50 dbm, −45 dbm, −44 dbm}, a minimum value of −50 dbm is determined as a reference received power, and then the terminal device may report the reference received power of −50 dbm and differential values of 5 db and 6 db between other received powers and the reference received power to the network device. If 1 dbm is used as quantization precision when the reference received power and the differential value between the received power of the second reference signal and the reference received power are reported, 7 bits may be used to report the reference received power of −50 dbm, 3 bits may be used to report the differential value between the received power of each second reference signal and the reference received power, and 2*3=6 bits are finally needed to report the differential value between the received power of the second reference signal and the reference received power.

A quantity of bits used to report the differential information of the second channel quality information may be determined based on the reference channel quality information for the second channel quality information. The terminal device may first decode the reference channel quality information for the second channel quality information, and then determine the quantity of bits used for the differential information of the second channel quality information based on the reference channel quality information, so that the network device can decode the differential information based on the determined quantity of bits, thereby reducing a quantity of blind detections performed because the network device cannot determine the quantity of bits used to report the differential information of the second channel quality information.

When there is one piece of channel quality information for a second reference signal, a received power of the second reference signal may be determined as a reference received power, and the reference received power is reported to the network device. In addition, when there is one piece of channel quality information for a second reference signal, a reference received power may not be determined, but a received power of the second reference signal is directly reported to the terminal device.

In an embodiment, the reporting, by the terminal device, the second channel quality information to the network device based on the QCL assumption relationship between the second reference signal and the first reference signal includes: when the first reference signal and the second reference signal do not meet a QCL assumption, reporting, by the terminal device, the second channel quality information to the network device in a non-differential manner.

It should be understood that, the reporting, by the terminal device, the second channel quality information to the network device in a non-differential manner means that the terminal device directly reports an absolute value of the second channel quality information to the network device, instead of reporting differential information between the second channel quality information and any other channel quality information.

In one embodiment, if the first reference signal and the second reference signal do not meet the QCL assumption, and the channel quality information for the second reference signal is the received power of the second reference signal, the terminal device may directly report a received power value of the second reference signal to the network device.

For example, there are three pieces of channel quality information for second reference signals, and received powers of the three second reference signals are respectively {−50 dbm, −45 dbm, −44 dbm}. In this case, the terminal device reports an absolute value of the received power of each second reference signal. If 1 dbm is used as quantization precision, a quantity of bits needed to report the received powers of the three second reference signals is 3*7=21.

In an embodiment, when the first reference signal and the second reference signal meet a QCL assumption, a quantity of bits occupied for reporting the channel quality information for the second reference signal is a first bit quantity; when the first reference signal and the second reference signal do not meet the QCL assumption, a quantity of bits occupied for reporting the channel quality information for the second reference signal is a second bit quantity; and the first bit quantity is less than or equal to the second bit quantity.

When the terminal device reports the channel quality information to the network device in a differential manner, a bit quantity of the channel quality information that is reported in the differential form may be determined based on the reference channel quality information, so that after obtaining the reference channel quality information, the network device can determine a quantity of bits used to report the differential information, thereby reducing a quantity of blind detections performed when the network device receives the differential information. In addition, to reduce design complexity of the terminal device, the network device may alternatively fixedly set a sum of reporting bit quantities of a reference RSRP and a differential RSRP to only several types, for example, fixedly set the sum of the reporting bit quantities of the reference RSRP and the differential RSRP to 52.

The following describes in detail how to report the channel quality information to the network with reference to Example 1 and Example 2.

Example 1

The network device sends a synchronization signal block (SS Block) and a CSI-RS to the terminal device (where the SS block and the CSI-RS are respectively equivalent to the first reference signal and the second reference signal in the foregoing description). When the SS block and the CSI-RS meet the QCL assumption, a reference signal received power (RSRP) of the SS block is obtained, the RSRP of the SS block is used as a reference RSRP, and the terminal device reports a differential value between an RSRP of the CSI-RS and the reference RSRP to the network device. However, when the SS block and the CSI-RS do not meet the QCL assumption, the RSRP of the SS block and the RSRP of the CSI-RS are independently reported.

1. A case in which an SS block and a CSI-RS meet the QCL assumption:

When there is a QCL assumption relationship between an SS block and a CSI-RS, operations of reporting channel quality information are as follows:

301. The network device sends an SS block to the terminal device.

302. The network device configures a QCL assumption relationship between an SS block and a CSI-RS for the terminal device.

303. The terminal device obtains RSRP information through measurement on the SS block, and reports the RSRP information and a resource number of the SS block to the network device.

304. The network device sends one or more reference signals CSI-RSs to the terminal device.

305. The terminal device determines, based on the QCL assumption relationship configured by the network device, that the reference signal CSI-RS and a previously measured SS block signal meet the QCL assumption.

306. The terminal device uses an RSRP result of an SS block that meets the QCL assumption with the CSI-RS and that is reported the previous time as a reference RSRP, obtains difference values between current measurement results of the one or more CSI-RSs and the reference RSRP, and correspondingly quantizes the differential values and then reports the differential values to the network device.

307. The network device receives two RSRP reporting results; the network device learns, based on QCL configuration information, that reference signals of the two reporting results meet the QCL assumption; and the network device uses an RSRP result that is reported the first time as a reference RSRP, uses a result that is reported the second time as a differential value, and obtains through decoding an absolute value of an RSRP that is reported the second time.

It should be understood that a sequence of the foregoing operations is not limited, and a sequence of two operations may be adjusted.

For example, in operation 301 to operation 307, an RSRP value of the SS block that is reported by the terminal device is −55 dbm. If 1 dbm is used as quantization precision, 7 bits are used for reporting. RSRP values of three CSI-RSs that are obtained by the terminal device through measurement are respectively {−50 dbm, −45 dbm, −44 dbm}. If the RSRP value of −55 dbm of the SS block is used as a reference RSRP, an RSRP value that is obtained through measurement the second time is reported in a differential manner. If 1 dbm is used as quantization precision, 3*4 bits=12 bits are needed to report the three RSRPs.

2. A case in which an SS block and a CSI-RS do not meet the QCL assumption:

When an SS block and a CSI-RS do not meet the QCL assumption, operations of reporting channel quality information are as follows:

401. The network device sends an SS block to the terminal device; the terminal device obtains RSRP information through measurement on the SS block, and reports the information and a resource number of the SS block to the network device; and the network device configures a QCL assumption relationship between an SS block and a CSI-RS for the terminal device.

402. The network device sends one or more CSI-RSs to the terminal device.

403. The terminal device determines, based on the QCL assumption relationship configured by the network device, that the CSI-RS and a previously measured SS block signal do not meet the QCL assumption.

404. The terminal device reports absolute values of current measurement results of the one or more CSI-RSs to the network device, or obtains a difference value between measurement results of a plurality of CSI-RSs, and sends the difference value to the network device.

405. The network device receives two RSRP reporting results; the network device determines, based on QCL configuration information, that reference signals of the two reporting results do not meet the QCL assumption; and the network device uses a result that is reported the second time as an absolute value, or performs internal decoding on a result that is reported the second time as an absolute value of an RSRP.

It should be understood that a sequence of the foregoing operations is not limited, and a sequence of two operations may be adjusted.

For example, in operation 401 to operation 405, an RSRP value of the SS block that is reported by the terminal device is −55 dbm. If 1 dbm is used as quantization precision, 7 bits are used for reporting. RSRP values of three CSI-RSs that are obtained by the terminal device through measurement are respectively {−50 dbm, −45 dbm, −44 dbm}. Absolute values of RSRPs of the three CSI-RSs are directly reported to the network device. If 1 dbm is used as quantization precision, 3*7 bits=21 bits are needed to report the three RSRPs.

For example, in operation 401 to operation 405, an RSRP value of the SS block that is reported by the terminal device is −55 dbm. If 1 dbm is used as quantization precision, 7 bits are used for reporting. RSRP values of three CSI-RSs that are obtained by the terminal device through measurement are respectively {−50 dbm, −45 dbm, −44 dbm}. If a minimum RSRP value of −50 dbm is used as a reference RSRP, if 1 dbm is used as quantization precision, 7+2*4 bits=15 bits are needed to report the three RSRPs.

Example 2

The network device sends an SS block and a CSI-RS to the terminal device, and when the SS block and the CSI-RS meet the QCL assumption, obtains an RSRP of the SS block, and uses the RSRP of the SS block and an RSRP compensation value as reference RSRPs; and the terminal device reports a differential value between an RSRP of the CSI-RS and the reference RSRP to the network device. However, when the SS block and the CSI-RS do not meet the QCL assumption, the RSRP of the SS block and the RSRP of the CSI-RS are independently reported.

When an SS block and a CSI-RS meet the QCL assumption, operations of reporting channel quality information are as follows:

501. The network device sends an SS block to the terminal device.

502. The network device configures a QCL assumption relationship between an SS block and a CSI-RS for the terminal device.

503. The terminal device obtains RSRP information through measurement on the SS block, and reports the RSRP information and a resource number of the SS block to the network device.

504. The network device sends one or more reference signals CSI-RSs to the terminal device.

505. The terminal device determines, based on the QCL assumption relationship configured by the network device, that the reference signal CSI-RS and a previously measured SS block signal meet the QCL assumption.

506. The terminal device uses an RSRP result of the SS block that is reported the previous time and an RSRP compensation value that is configured by the network device or predefined as reference RSRPs, obtains difference values between current measurement results of the one or more CSI-RSs and the reference RSRP, and correspondingly quantizes the differential values and then reports the differential values to the network device.

507. The network device receives two RSRP reporting results; the network device learns, based on QCL configuration information, that reference signals of the two reporting results meet the QCL assumption; and the network device uses an RSRP result that is reported the first time and the predefined RSRP compensation value as reference RSRPs, uses a result that is reported the second time as a differential value, and obtains through decoding an absolute value of an RSRP that is reported the second time.

It should be understood that a sequence of the foregoing operations is not limited, and a sequence of two operations may be adjusted.

For example, in operation 501 to operation 507, an RSRP value of the SS block that is reported by the terminal device is −65 dbm. If 1 dbm is used as quantization precision, 7 bits are used for reporting. RSRP values of three CSI-RSs that are obtained by the terminal device through measurement are respectively {−50 dbm, −45 dbm, −44 dbm}, and the predefined RSRP compensation value is 10 db. If a sum of the RSRP value of the SS block and the predefined RSRP compensation value is used as a reference RSRP, an RSRP value that is obtained through measurement the second time is reported in a differential manner. If 1 dbm is used as quantization precision, 3*4 bits=12 bits are needed to report the three RSRPs.

It should be understood that, reporting of the received power of the reference signal in the differential manner is described in Example 1 and Example 2 above. Actually, other information in the channel quality information may also be reported in the differential manner. For example, the terminal device may also report a reference signal received quality (RSRQ) in the differential manner.

The channel quality information reporting method in the embodiments of this application is described above with reference to FIG. 2 from a perspective of the terminal device. A channel quality information reporting method in an embodiment of this application is described below with reference to FIG. 3 from a perspective of the network device. It should be understood that, operations in the method shown in FIG. 3 correspond to the operations in the method shown in FIG. 2. For brevity, repeated descriptions are appropriately omitted below.

Figure 3:
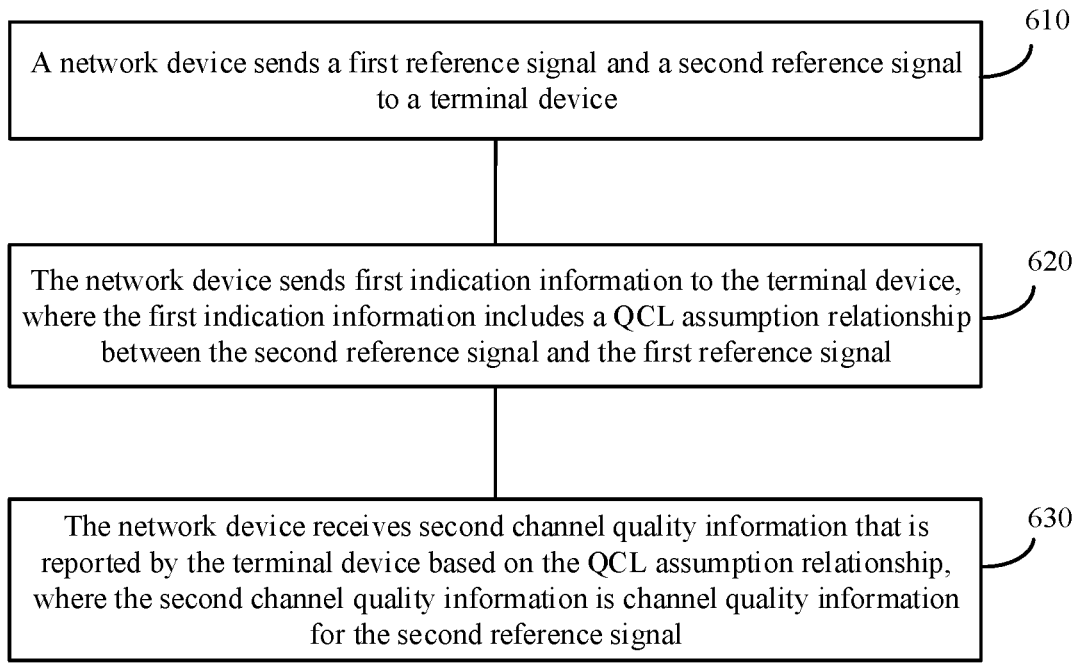
FIG. 3 is a schematic flowchart of a channel quality information reporting method according to an embodiment of this application.

FIG. 3 is a schematic flowchart of a channel quality information reporting method according to an embodiment of this application. The method shown in FIG. 3 includes operation 610 to operation 630. The following describes operation 610 to operation 630 in detail.

610. A network device sends a first reference signal and a second reference signal to a terminal device.

620. The network device sends first indication information to the terminal device, where the first indication information includes a QCL assumption relationship between the second reference signal and the first reference signal.

620. The network device receives second channel quality information that is reported by the terminal device based on the QCL assumption relationship, where the second channel quality information is channel quality information for the second reference signal.

In this application, the second channel quality information is reported based on the QCL assumption relationship between the second reference signal and the first reference signal, so that resource overheads for reporting the second channel quality information can be reduced.

In one embodiment, when the first reference signal and the second reference signal meet a QCL assumption, some spatial features of the first reference signal and the second reference signal are strongly correlated, so that channel quality information respectively corresponding to the first reference signal and the second reference signal is relatively similar. Therefore, when the second channel quality information is reported, the channel quality information for the first reference signal may be used as a reference, and when the channel quality information for the second reference signal is reported, only differential information between the channel quality information for the second reference signal and the channel quality information for the first reference signal is reported, thereby greatly reducing the resource overheads for reporting the second channel quality information.

In an embodiment, the receiving, by the network device, the second channel quality information that is reported by the terminal device based on the QCL assumption relationship between the second reference signal and the first reference signal includes: receiving, by the network device, the second channel quality information that is reported by the terminal device based on at least one of the following information that is determined based on the QCL assumption relationship:

reference channel quality information for the second channel quality information;

a reporting operation of the second channel quality information;

a reporting range of the second channel quality information; and a reporting bit quantity of the second channel quality information.

In an embodiment, the method further includes: when the first reference signal and the second reference signal meet a QCL assumption, determining, by the network device, reference channel quality information for the second channel quality information; and the receiving, by the network device, the second channel quality information that is reported by the terminal device based on the QCL assumption relationship between the second reference signal and the first reference signal includes: receiving, by the network device, differential information that is between the second channel quality information and the reference channel quality information and that is reported by the terminal device.

In an embodiment, the determining, by the network device, the reference channel quality information for the second channel quality information includes: determining, by the network device, channel quality information for the first reference signal as the reference channel quality information for the second channel quality information.

In an embodiment, the determining, by the network device, the reference channel quality information for the second channel quality information includes: determining, by the network device, the reference channel quality information for the second channel quality information based on channel quality information for the first reference signal and first compensation information.

In an embodiment, the first compensation information is preset information.

In an embodiment, the determining, by the network device, the reference channel quality information for the second channel quality information includes: determining, by the network device, the reference channel quality information for the second channel quality information based on the second channel quality information.

The determining, by the network device, the reference channel quality information for the second channel quality information includes: determining, by the network device, the reference channel quality information for the second channel quality information based on the channel quality information for the second reference signal.

It should be understood that, the network device may determine the reference channel quality information for the second channel quality information in one of Manner 1 to Manner 3 above. For particular content, refer to the content in Manner 1 to Manner 3 above. Details are not described herein again.

In an embodiment, the receiving, by the network device, the second channel quality information that is reported by the terminal device based on the QCL assumption relationship between the second reference signal and the first reference signal includes: when the first reference signal and the second reference signal do not meet a QCL assumption, receiving, by the network device, the second channel quality information that is reported by the terminal device in a non-differential manner.

In an embodiment, the first reference signal includes a synchronization signal block, and the second reference signal includes a CSI-RS.

In an embodiment, when the first reference signal and the second reference signal meet a QCL assumption, a quantity of bits occupied for reporting the second channel quality information is a first bit quantity; when the first reference signal and the second reference signal do not meet the QCL assumption, a quantity of bits occupied for reporting the second channel quality information is a second bit quantity; and the first bit quantity is less than or equal to the second bit quantity.

The channel quality information reporting method in the embodiments of this application is described above with reference to FIG. 2 and FIG. 3 respectively from perspectives of the terminal device and the network device. A terminal device and a network device in embodiments of this application are described below with reference to FIG. 4 to FIG. 7. It should be understood that, the terminal device in FIG. 4 and FIG. 6 corresponds to the method shown in FIG. 2, and the terminal device in FIG. 4 and FIG. 6 can perform the method shown in FIG. 2; and the network device in FIG. 5 and FIG. 7 corresponds to the method shown in FIG. 3, and the network device in FIG. 5 and FIG. 7 can perform the method shown in FIG. 3. For brevity, repeated descriptions are appropriately omitted below.

Figure 4:
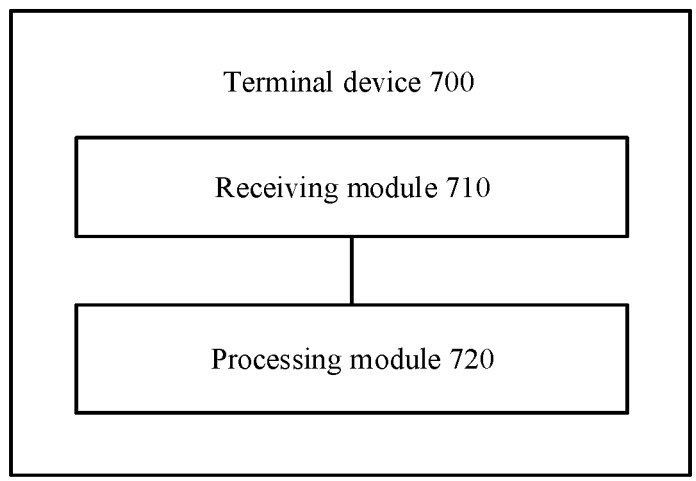
FIG. 4 is a schematic block diagram of a terminal device according to an embodiment of this application.

FIG. 4 is a schematic block diagram of a terminal device for channel quality information according to an embodiment of this application. The terminal device 700 in FIG. 4 includes:

a receiving module 710, configured to receive a first reference signal and a second reference signal that are sent by a network device, where the receiving module 710 is further configured to receive first indication information sent by the network device, where the first indication information includes a QCL assumption relationship between the second reference signal and the first reference signal; and a processing module 720, configured to report second channel quality information to the network device based on the QCL assumption relationship, where the second channel quality information is channel quality information for the second reference signal.

In an embodiment, the processing module 720 is configured to:

report the second channel quality information to the network device based on at least one of the following information that is determined based on the QCL assumption relationship:

reference channel quality information for the second channel quality information;

a reporting operation of the second channel quality information;

a reporting range of the second channel quality information; and a reporting bit quantity of the second channel quality information.

In an embodiment, the processing module 720 is configured to: when the first reference signal and the second reference signal meet a QCL assumption, determine reference channel quality information for the second channel quality information; and report differential information between the second channel quality information and the reference channel quality information to the network device.

In an embodiment, the processing module 720 is configured to determine channel quality information for the first reference signal as the reference channel quality information for the second channel quality information.

In an embodiment, the processing module 720 is configured to determine the reference channel quality information for the second channel quality information based on channel quality information for the first reference signal and first compensation information.

In an embodiment, the first compensation information is configured by the network device for the terminal device by using at least one of higher layer signaling or physical layer signaling, or the first compensation information is preset information.

In an embodiment, the processing module 720 is configured to determine the reference channel quality information for the second channel quality information based on the second channel quality information.

In an embodiment, the processing module 720 is configured to: when the first reference signal and the second reference signal do not meet a QCL assumption, report the second channel quality information to the network device in anon-differential manner.

In an embodiment, the first reference signal includes a synchronization signal block, and the second reference signal includes a CSI-RS.

In an embodiment, when the first reference signal and the second reference signal meet a QCL assumption, a quantity of bits occupied by the processing module 720 for reporting the second channel quality information is a first bit quantity; when the first reference signal and the second reference signal do not meet the QCL assumption, a quantity of bits occupied by the processing module 720 for reporting the second channel quality information is a second bit quantity; and the first bit quantity is less than or equal to the second bit quantity.

Figure 5:
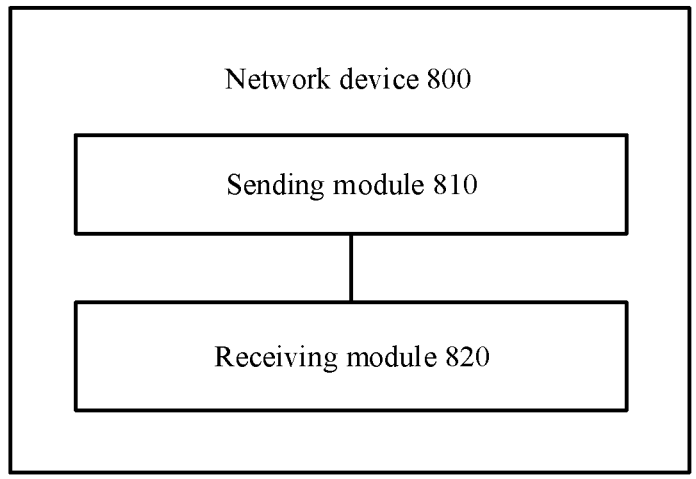
FIG. 5 is a schematic block diagram of a network device according to an embodiment of this application.

FIG. 5 is a schematic block diagram of a network device for channel quality information according to an embodiment of this application. The network device 800 in FIG. 5 includes:

a sending module 810, configured to send a first reference signal and a second reference signal to a terminal device, where the sending module 810 is further configured to send first indication information to the terminal device, where the first indication information includes a QCL assumption relationship between the second reference signal and the first reference signal; and a receiving module 820, configured to receive second channel quality information that is reported by the terminal device based on the QCL assumption relationship, where the second channel quality information is channel quality information for the second reference signal.

In an embodiment, the receiving module 820 is configured to:

receive the second channel quality information that is reported by the terminal device based on at least one of the following information that is determined based on the QCL assumption relationship:

reference channel quality information for the second channel quality information;

a reporting operation of the second channel quality information;

a reporting range of the second channel quality information; and a reporting bit quantity of the second channel quality information.

In an embodiment, the network device further includes:

a processing module 830, configured to: when the first reference signal and the second reference signal meet a QCL assumption, determine reference channel quality information for the second channel quality information; and the receiving module is configured to receive differential information that is between the second channel quality information and the reference channel quality information and that is reported by the terminal device.

In an embodiment, the processing module 830 is configured to determine channel quality information for the first reference signal as the reference channel quality information for the second channel quality information.

In an embodiment, the processing module 830 is configured to determine the reference channel quality information for the second channel quality information based on channel quality information for the first reference signal and first compensation information.

In an embodiment, the first compensation information is preset information.

In an embodiment, the processing module 830 is configured to determine the reference channel quality information for the second channel quality information based on the second channel quality information.

In an embodiment, the receiving module 820 is configured to: when the first reference signal and the second reference signal do not meet a QCL assumption, receive the second channel quality information that is reported by the terminal device in a non-differential manner.

In an embodiment, the first reference signal includes a synchronization signal block, and the second reference signal includes a CSI-RS.

In an embodiment, when the first reference signal and the second reference signal meet a QCL assumption, a quantity of bits occupied for reporting the second channel quality information is a first bit quantity; when the first reference signal and the second reference signal do not meet the QCL assumption, a quantity of bits occupied for reporting the second channel quality information is a second bit quantity; and the first bit quantity is less than or equal to the second bit quantity.

Figure 6:
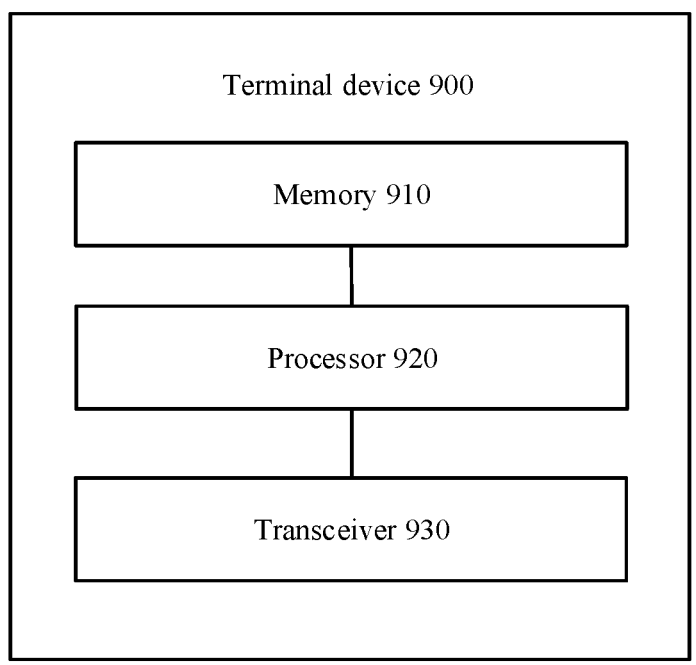
FIG. 6 is a schematic block diagram of a terminal device according to an embodiment of this application.

FIG. 6 is a schematic block diagram of a terminal device for channel quality information according to an embodiment of this application. The terminal device 900 in FIG. 6 includes:

a memory 910, configured to store a program;

a processor 920, configured to execute the program stored in the memory 920; and a transceiver 930.

When the program in the memory 910 is executed, the processor 920 is configured to control the transceiver 930 to perform the following operations: receiving a first reference signal and a second reference signal that are sent by a network device; and receiving first indication information sent by the network device, where the first indication information includes a QCL assumption relationship between the second reference signal and the first reference signal.

The processor 920 is further configured to report second channel quality information to the network device based on the QCL assumption relationship, where the second channel quality information is channel quality information for the second reference signal.

In an embodiment, the processor 920 is configured to:

report the second channel quality information to the network device based on at least one of the following information that is determined based on the QCL assumption relationship:

reference channel quality information for the second channel quality information;

a reporting operation of the second channel quality information;

a reporting range of the second channel quality information; and a reporting bit quantity of the second channel quality information.

In an embodiment, the processor 920 is configured to: when the first reference signal and the second reference signal meet a QCL assumption, determine reference channel quality information for the second channel quality information; and report differential information between the second channel quality information and the reference channel quality information to the network device.

In an embodiment, the processor 920 is configured to determine channel quality information for the first reference signal as the reference channel quality information for the second channel quality information.

In an embodiment, the processor 920 is configured to determine the reference channel quality information for the second channel quality information based on channel quality information for the first reference signal and first compensation information.

In an embodiment, the first compensation information is configured by the network device for the terminal device by using at least one of higher layer signaling or physical layer signaling, or the first compensation information is preset information.

In an embodiment, the processor 920 is configured to determine the reference channel quality information for the second channel quality information based on the second channel quality information.

In an embodiment, the processor 920 is configured to: when the first reference signal and the second reference signal do not meet a QCL assumption, report the second channel quality information to the network device in a non-differential manner.

In an embodiment, the first reference signal includes a synchronization signal block, and the second reference signal includes a CSI-RS.

In an embodiment, when the first reference signal and the second reference signal meet a QCL assumption, a quantity of bits occupied for reporting the second channel quality information is a first bit quantity; when the first reference signal and the second reference signal do not meet the QCL assumption, a quantity of bits occupied for reporting the second channel quality information is a second bit quantity; and the first bit quantity is less than or equal to the second bit quantity.

Figure 7:
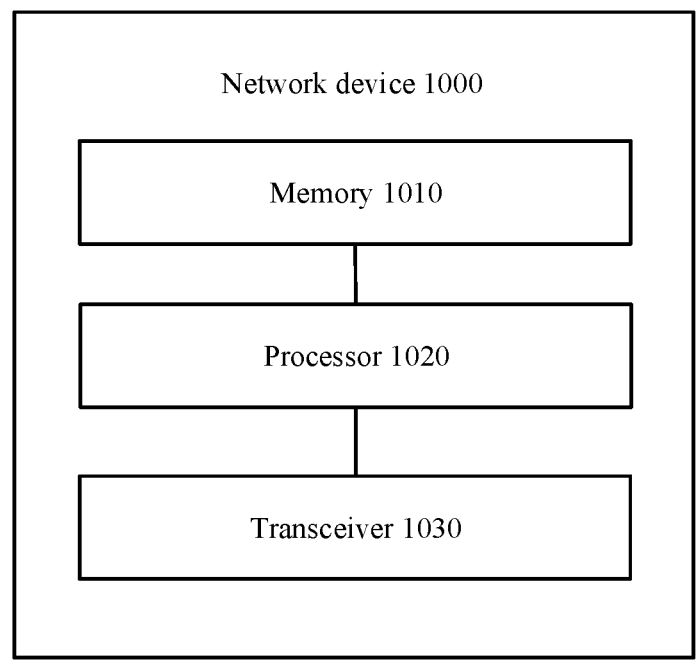
FIG. 7 is a schematic block diagram of a network device according to an embodiment of this application.

FIG. 7 is a schematic block diagram of a network device for channel quality information according to an embodiment of this application. The network device 1000 in FIG. 7 includes:

a memory 1010, configured to store a program;

a processor 1020, configured to execute the program stored in the memory 1010; and a transceiver 1030.

When the program in the memory 1020 is executed, the processor 1020 is configured to control the transceiver 1030 to perform the following operations: sending a first reference signal and a second reference signal to a terminal device; sending first indication information to the terminal device, where the first indication information includes QCL assumption relationship between the second reference signal and the first reference signal; and receiving second channel quality information that is reported by the terminal device based on the QCL assumption relationship between the second reference signal and the first reference signal, where the second channel quality information is channel quality information for the second reference signal.

In an embodiment, the transceiver 1030 is configured to:

receive the second channel quality information that is reported by the terminal device based on at least one of the following information that is determined based on the QCL assumption relationship:

reference channel quality information for the second channel quality information;

a reporting operation of the second channel quality information;

a reporting range of the second channel quality information; and a reporting bit quantity of the second channel quality information.

In an embodiment, the processor 1020 is configured to: when the first reference signal and the second reference signal meet a QCL assumption, determine reference channel quality information for the second channel quality information; and the transceiver 1030 is configured to receive differential information that is between the second channel quality information and the reference channel quality information and that is reported by the terminal device.

In an embodiment, the processor 1020 is configured to determine channel quality information for the first reference signal as the reference channel quality information for the second channel quality information.

In an embodiment, the processor 1020 is configured to determine the reference channel quality information for the second channel quality information based on channel quality information for the first reference signal and first compensation information.

In an embodiment, the first compensation information is preset information.

In an embodiment, the processor 1020 is configured to determine the reference channel quality information for the second channel quality information based on the second channel quality information.

In an embodiment, the processor 1020 is configured to: when the first reference signal and the second reference signal do not meet a QCL assumption, receive the second channel quality information that is reported by the terminal device in a non-differential manner.

In an embodiment, the first reference signal includes a synchronization signal block, and the second reference signal includes a CSI-RS.

In an embodiment, when the first reference signal and the second reference signal meet a QCL assumption, a quantity of bits occupied for reporting the second channel quality information is a first bit quantity; when the first reference signal and the second reference signal do not meet the QCL assumption, a quantity of bits occupied for reporting the second channel quality information is a second bit quantity; and the first bit quantity is less than or equal to the second bit quantity.

This application provides a chip. The chip includes a processor and a communications interface. The communications interface is configured to communicate with an external device. The processor is configured to perform the channel quality information reporting method in the embodiments of this application.

In one embodiment, the chip may further include a memory. The memory stores an instruction. The processor is configured to execute the instruction stored in the memory. When the instruction is executed, the processor is configured to perform the channel quality information reporting method in the embodiments of this application.

In one embodiment, the chip is integrated into a terminal device.

This application provides a chip. The chip includes a processor and a communications interface. The communications interface is configured to communicate with an external device. The processor is configured to perform the channel quality information reporting method in the embodiments of this application.

In one embodiment, the chip may further include a memory. The memory stores an instruction. The processor is configured to execute the instruction stored in the memory. When the instruction is executed, the processor is configured to perform the channel quality information reporting method in the embodiments of this application.

In one embodiment, the chip is integrated into a network device.

This application provides a computer-readable storage medium. The computer-readable storage medium stores program code to be executed by a device. The program code includes an instruction for performing the channel quality information reporting method in the embodiments of this application.

This application provides a computer-readable storage medium. The computer-readable storage medium stores program code to be executed by a device. The program code includes an instruction for performing the channel quality information reporting method in the embodiments of this application.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the embodiment goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A channel quality information reporting method comprising:
    receiving, by a terminal device, a first reference signal and a second reference signal sent by a network device;
    receiving, by the terminal device, first indication information sent by the network device, wherein the first indication information comprises a quasi co-location (QCL) assumption relationship between the second reference signal and the first reference signal; and
    reporting, by the terminal device, second channel quality information to the network device based on the QCL assumption relationship, wherein the second channel quality information is channel quality information for the second reference signal, wherein the reporting, by the terminal device, the second channel quality information to the network device based on the QCL assumption relationship between the second reference signal and the first reference signal includes: when the first reference signal and the second reference signal meet a QCL assumption, determining, by the terminal device, reference channel quality information for the second channel quality information; and reporting, by the terminal device, differential information between the second channel quality information and the reference channel quality information to the network device.

2. The method according to claim 1, wherein reporting the channel quality information for the second reference signal to the network device comprises:
    reporting, by the terminal device, the second channel quality information to the network device based on at least one of the following information that is determined based on the QCL assumption relationship:
    reference channel quality information for the second channel quality information;
    a reporting operation of the second channel quality information;
    a reporting range of the second channel quality information; and
    a reporting bit quantity of the second channel quality information.

3. The method according to claim 1, wherein the determining, by the terminal device, the reference channel quality information for the second channel quality information comprises:
    determining, by the terminal device, channel quality information for the first reference signal as the reference channel quality information for the second channel quality information.

4. The method according to claim 1, wherein the determining, by the terminal device, the reference channel quality information for the second channel quality information comprises:
    determining, by the terminal device, the reference channel quality information for the second channel quality information based on channel quality information for the first reference signal and first compensation information.

5. The method according to claim 4, wherein the first compensation information is configured by the network device for the terminal device by using at least one of higher layer signaling or physical layer signaling, or the first compensation information is preset information.

6. The method according to claim 1, wherein the determining, by the terminal device, the reference channel quality information for the second channel quality information comprises:
    determining, by the terminal device, the reference channel quality information for the second channel quality information based on the second channel quality information.

7. The method according to claim 1, wherein the reporting, by the terminal device, the second channel quality information to the network device based on the QCL assumption relationship between the second reference signal and the first reference signal comprises:
    when the first reference signal and the second reference signal do not meet a QCL assumption, reporting, by the terminal device, the second channel quality information to the network device in a non-differential manner.

8. The method according to claim 1, wherein the first reference signal comprises a synchronization signal block, and the second reference signal comprises a channel state information-reference signal CSI-RS.

9. The method according to claim 1, wherein when the first reference signal and the second reference signal meet a QCL assumption, a quantity of bits occupied for reporting the second channel quality information is a first bit quantity; when the first reference signal and the second reference signal do not meet the QCL assumption, a quantity of bits occupied for reporting the second channel quality information is a second bit quantity; and the first bit quantity is less than or equal to the second bit quantity.

10. A terminal device comprising:
    a transceiver configured to receive a first reference signal and a second reference signal sent by a network device, wherein
    the transceiver is further configured to receive first indication information sent by the network device, wherein the first indication information comprises a quasi colocation (QCL) assumption relationship between the second reference signal and the first reference signal; and
    a processor configured to report second channel quality information to the network device based on the QCL assumption relationship, wherein the second channel quality information is channel quality information for the second reference signal, wherein the reporting the second channel quality information to the network device based on the QCL assumption relationship between the second reference signal and the first reference signal includes: when the first reference signal and the second reference signal meet a QCL assumption, determining, reference channel quality information for the second channel quality information; and reporting differential information between the second channel quality information and the reference channel quality information to the network device.

11. The terminal device according to claim 10, wherein the processor is configured to:
report the second channel quality information to the network device based on at least one of the following information that is determined based on the QCL assumption relationship:
reference channel quality information for the second channel quality information;
a reporting operation of the second channel quality information;
a reporting range of the second channel quality information; and
a reporting bit quantity of the second channel quality information.

12. The terminal device according to claim 10, wherein the processor is configured to:
determine channel quality information for the first reference signal as the reference channel quality information for the second channel quality information.

13. The terminal device according to claim 10, wherein the processor is configured to:
determine the reference channel quality information for the second channel quality information based on channel quality information for the first reference signal and first compensation information.

14. The terminal device according to claim 13, wherein the first compensation information is configured by the network device for the terminal device by using at least one of higher layer signaling or physical layer signaling, or the first compensation information is preset information.

15. The terminal device according to claim 10, wherein the processor is configured to:
determine the reference channel quality information for the second channel quality information based on the second channel quality information.

* * * * *